US00RE37531E

(19) United States
(12) Reissued Patent
Chaco et al.

(10) Patent Number: US RE37,531 E
(45) Date of Reissued Patent: Jan. 29, 2002

(54) SYSTEM FOR IDENTIFYING OBJECT LOCATIONS

(75) Inventors: John Chaco, Seymour; Yaron Ram, Fairfield, both of CT (US)

(73) Assignee: Executone Information Systems, Inc., Norwalk, CT (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/943,884

(22) Filed: Oct. 3, 1997

Related U.S. Patent Documents

Reissue of:
(64) Patent No.: 5,455,851
Issued: Oct. 3, 1995
Appl. No.: 08/087,394
Filed: Jul. 2, 1993

(51) Int. Cl.[7] ..... H04M 11/00; G08B 5/22

(52) U.S. Cl. ..... 379/38; 379/37; 340/825.49

(58) Field of Search ..... 379/37–38, 56.1–56.3, 379/93.01, 93.05, 93.17–93.18, 93.25, 93.28, 93.31–93.32, 100.15, 201; 340/539, 543, 573, 825.49, 825.54–825.55; 455/31.3, 500; 367/117, 199; 359/142–143, 154, 157; 342/450; 235/380–382; 40/1.5

(56) References Cited

U.S. PATENT DOCUMENTS

| | | | | |
|---|---|---|---|---|
| 3,364,427 A | 1/1968 | Bennett | | |
| 3,696,384 A | 10/1972 | Lester | ..... | 340/312 |
| 3,805,227 A | 4/1974 | Lester | ..... | 340/312 |
| 3,805,265 A | 4/1974 | Lester | ..... | 340/312 |
| 4,225,953 A | 9/1980 | Simon et al. | ..... | 367/117 |
| 4,275,385 A | 6/1981 | White | ..... | 340/312 |
| 4,553,267 A | 11/1985 | Crimmins | ..... | 455/607 |
| 4,601,064 A | 7/1986 | Shipley | ..... | 455/608 |
| 4,649,385 A | 3/1987 | Aires et al. | ..... | 379/56.3 |

(List continued on next page.)

FOREIGN PATENT DOCUMENTS

| | | |
|---|---|---|
| EP | 0356125 | 2/1990 |
| FR | 2604808 | 4/1988 |
| FR | 2615984 | 12/1988 |
| FR | 2630565 | 10/1989 |
| GB | 2225141 | 5/1990 |
| GB | 2230365 | 10/1990 |
| WO | 9309621 | 5/1993 |

OTHER PUBLICATIONS

"Great New Product Infrared Locator", Teleconnect, Feb. 1986, 4 pages.
Ooi, Lim & Lau, "Low Cost RF Identification and Locating System" IEEE Transactions on Consumer Electronics, vol. 35, No. 4, Nov., 1989, pp. 831–839.
Mark Weiser, "The Computer for the 21st Century", Scientific American, Sep., 1991, pp. 94–95, 98–100.
"Infra–Com®", A Staff and Equipment Locating and Signaling System from United Identification Systems Corp., 8 pages.
"Keeping Track of Alzheimer and Dementia Prone Patients Just Got Easier", Sycon, 5 pages.
Sekurmed Sales Brochure, 5 pages.

*Primary Examiner*—Curtis Kuntz
*Assistant Examiner*—George Eng
(74) *Attorney, Agent, or Firm*—Dilworth & Barrese

(57) ABSTRACT

An objection location system for locating and communicating with personnel or objects within a facility. Remote badges are coupled to respective objects or personnel to be located. The badges include transmission means for transmitting identification information associated with their respective objects or personnel. Operational parameters are stored in the badges and are monitored for controlling the operation of the badges. The badge may be in the form of a wristband.

61 Claims, 7 Drawing Sheets

U.S. PATENT DOCUMENTS

| | | | | |
|---|---|---|---|---|
| 4,652,860 | A | 3/1987 | Weishaupt et al. | 340/825.22 |
| 4,690,568 | A * | 9/1987 | Odagiri et al. | 368/204 |
| 4,757,553 | A | 7/1988 | Crimmins | 455/607 |
| 4,835,372 | A | 5/1989 | Gombrich et al. | 235/375 |
| 4,837,568 | A | 6/1989 | Snaper | 340/825.54 |
| 4,885,571 | A | 12/1989 | Pauley et al. | 340/573 |
| 4,955,000 | A | 9/1990 | Nastrom | 367/117 |
| 4,977,619 | A | 12/1990 | Crimmins | 455/607 |
| 4,980,679 | A | 12/1990 | Klaubert | 340/825.34 |
| 5,054,052 | A | 10/1991 | Nonami | 379/56.3 |
| 5,119,104 | A | 6/1992 | Heller | 342/450 |
| 5,140,626 | A | 8/1992 | Ory et al. | 379/56.3 |
| 5,148,148 | A | 9/1992 | Shima et al. | 340/539 |

* cited by examiner

SYSTEM FOR IDENTIFYING OBJECT LOCATIONS

Matter enclosed in heavy brackets [ ] appears in the original patent but forms no part of this reissue specification; matter printed in italics indicates the additions made by reissue.

TECHNICAL FIELD OF THE INVENTION

This invention relates to an object location system, more particularly a system having a compact and intelligent badge or bracelet attached to an object for determining the location of the object.

BACKGROUND OF THE INVENTION

Location systems for locating objects or personnel within a facility are known. One type of personnel location system used in hospitals involves personnel within the facility reporting their locations by manually setting switches at designated areas. The switches are monitored at a central station and the locations of the personnel are determined by the locations of the activated switches. Other proposed personnel or object location techniques include systems which locate personnel or objects by seeking out where the object or personnel is closest to designated monitors. Such systems generally include a central controller connected in a plurality of transceivers distributed at designated locations throughout a facility. Portable units are worn or attached to objects or personnel to be located. Each portable unit is assigned a unique identification. To locate a personnel, the central controller causes the transceivers to broadcast or page the portable unit by its identification. The broadcast or page signal is received by the portable units but only the portable unit having a matching identification will respond with a confirmation signal, which is received by the transceiver located closest to the responding portable unit. The transceiver in turn reports to the central controller that it has received a confirmation signal. The location of the portable unit is determined by the central controller by the message received from the transceiver. Location systems employing such location technique are described in U.S. Pat. No. 4,649,385 to Aires et al. and U.S. Pat. Nos. 3,805,265, 3,805,226 and 3,696,384 to Lester. One problem with the systems of this type is in the portable units. They must include electronics with adequate sensitivity to receive signals broadcast from the transceivers and adequate power to transmit a reply. The portable units became bulky and cumbersome and therefore inconvenient to be worn or attached.

U.S. Pat. No. 4,955,000 to Nastrom and U.S. Pat. No. 5,119,104 to Heller propose location reporting systems which include portable electronic units worn or attached to objects. The portable units periodically transmit individually unique ID signals. A plurality of transceivers are distributed at designated locations and the transceiver(s) within range of the portable unit transmissions receives the transmitted ID signals. The transceiver(s) in turn communicates the ID information to the central control unit. From the location of the transceiver and the ID of the portable unit, the central control unit is able to determine the location of the object. A disadvantage of this type of location system is the large amount of energy required to periodically transmit information from a portable unit, causing a continual drain on the power source. A large battery is required for usage of the portable unit for any meaningful period of time. The size of the portable unit is then dictated by the size of the battery.

Further, unless the portable unit is efficiently used, frequent battery replacement and maintenance is required.

It can be seen that there exists a need for a location system having portable units which are compact in size and include capability to optimize the efficiency of operation.

SUMMARY OF THE INVENTION

The present invention is an object location system for locating and communicating with personnel or objects within a facility. The system according to the preferred embodiment of the present invention comprises a plurality of badges coupled to objects, each of the badges including: wireless transmitters for transmitting signals including a unique identification signal; a processor having associated memory and stored programs, the memory having a database with stored information including a plurality of operational parameters. The stored programs are executed by the badge processor for controlling badge operations including the control of the wireless transmitter depending upon the processing of the operational parameters. The badge is also capable of interfacing with an external device for data entry including the operational parameters into the badge memory. The location system of the present invention also includes a plurality of receivers disposed at spaced apart areas within the facility, each of the receivers is capable of receiving signals including the ID signals transmitted from the wireless transmitters of the badges, and a processor for processing the received information. A central processor receives messages from the plurality of receivers and the messages are periodically processed by the central processor for determining the location of each of the badges.

In another embodiment, the electronics of the badge unit is integrated in a housing which is attached to a bracelet which can be worn by a person, such as his wrist or ankle.

In a further embodiment of the present invention, the badge unit further includes an infrared receiver, a voice circuit with associated speaker and microphone for facilitating voice communication, a keypad for data entry, and a display for displaying information.

In still another embodiment of the present invention, the receivers are coupled to a PBX, which is coupled to the central computer and a plurality of telephones throughout the facility. The badge identification information is reported to the PBX and/or the central computer, facilitating the retrieval of location information of any identified personnel from any telephone connected to the PBX.

BRIEF DESCRIPTION OF THE PREFERRED EMBODIMENTS

DETAILED DESCRIPTION OF THE PREFERRED EMBODIMENTS

Figure 1:
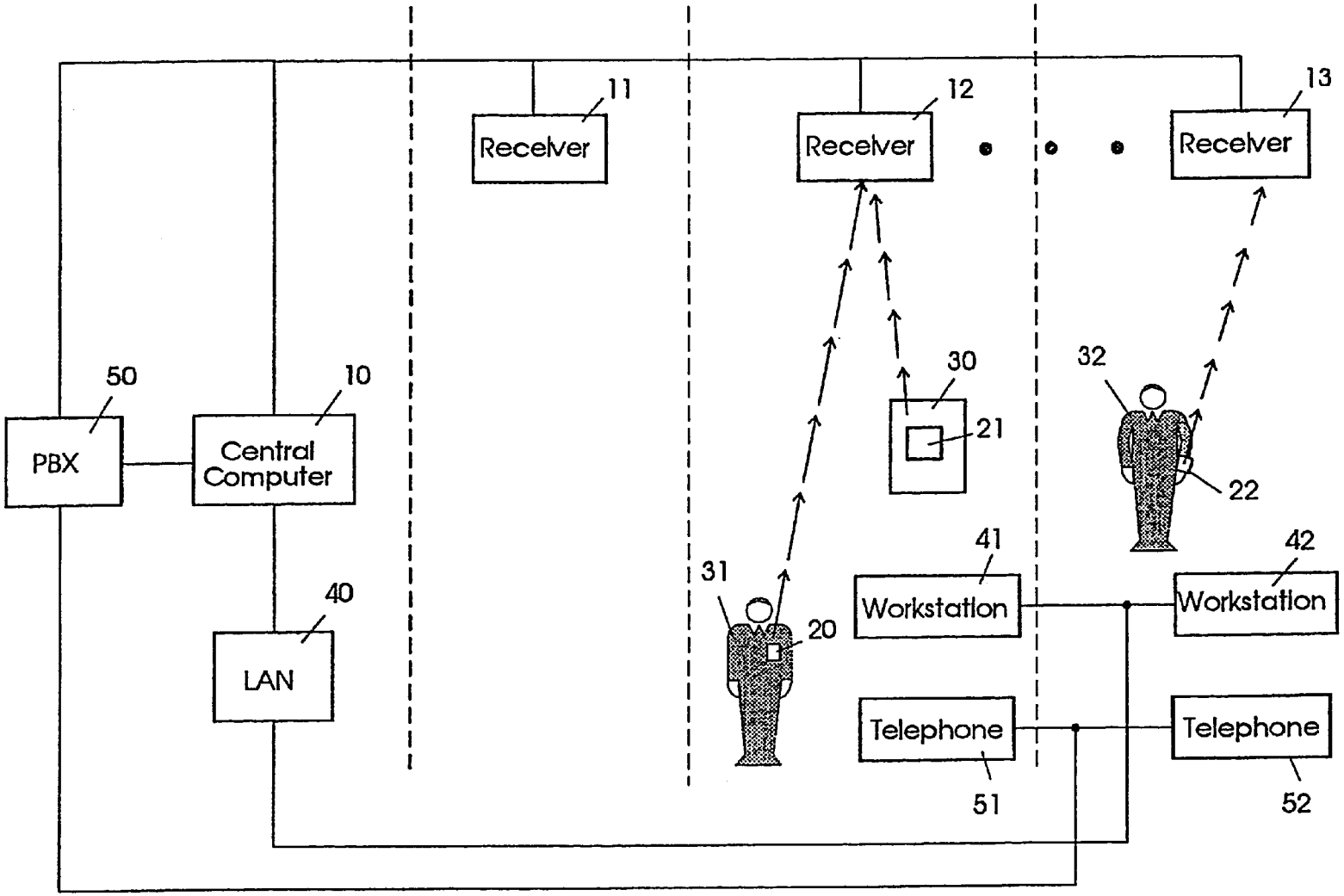
FIG. 1 illustrates the components of the location system according to the present invention.

FIG. 1 illustrates an exemplary use of the badge and bracelet units in a location and communication system ("locator system") in accordance to the present invention. A plurality of receivers 11, 12 and 13 are disposed spatially apart throughout a facility such as an office or a hospital. Each receiver receives signals transmitted by the badges and bracelets which are within the receiver's range of reception. Each receiver is identifiable by central computer 10. Badge 20 and bracelet 22 are worn by facility personnel 31, 32 and badge 21 is shown attached to object 30, which may be a facility equipment which may be mobile, commonly used, but in short supply. Each of the badges and bracelets transmits signals including an individually unique identification at selected intervals. The signals are received by the most proximal receiver and the receiver in turn communicates the received information to the central computer 10. The central computer 10 includes in its memory the storage of information pertaining to the physical aspects of the facility such as rooms, floors, the identification of each receiver and its associated location, the identification of each badge or bracelet in operation and information regrading the object or person associated with each badge or bracelet. The central computer 10 receives messages from each receiver at selected intervals. Included in the messages are information last received by each of the receivers. The central computer 10 processes the messages received from the receivers and substantially continually updates the location of each badge or bracelet and its associated person or object within the facility. Location identification information may be retrieved from the central computer 10 by inquiring by badge identification, personnel name, and/or receiver identification. The central computer 10 may respond with the most recently updated information or respond with a history of location information from its memory. For example, a report on who visited a room, when and for how long.

The central computer 10 further communicates with LAN (local area network) 40, which in turn may be connected to a plurality of personal computers or workstations 41 and 42, facilitating communication with the central computer 10 and retrieval of updated location information from stations connected to the LAN 40 throughout the facility. According to the preferred embodiment, the central computer 10 may be an IBM compatible personal computer. A LAN compatible and the IBM PC protocol is coupled to the central computer 10.

A telephone PBX (private-branch exchange) 50 couples to the plurality of receivers, the central computer 10, and to a plurality of telephones throughout the facility, e.g., telephones 51 and 52. The system configuration as shown facilitates direct communication of the receivers with the central computer 10 or the PBX 50. The receivers may also communicate with the central computer 10 through the PBX 50 or communicate with the PBX 50 through the central computer 10. The system as configured allows the flexibility of processing and transferring the information received from the receivers by the central computer 10 or shared processing and transferring responsibilities between the central computer 10 and the PBX 50. For example, the PBX 50 may store the information such as the identity and location of each receiver. When a message is received by the PBX 50 from a receiver, the PBX adds the receiver identity or location information to the message and forwards the message to the central computer 10 for further processing and updating. Alternatively, the functions and components of the central computer 10 may be integrated within PBX 50. In such alternate embodiment, the PBX 50 performs the functions described for both central computer 10 and PBX 50.

Another exemplary usage of the system is the location of personnel with the telephones. For example, personnel 31 may locate personnel 32 by dialing the ID of personnel 32 on telephone 51. The PBX receives the call from telephone 51 and inquires the central computer 10 as to the location of personnel 32. The central computer 10 retrieves the location information of personnel 32 and identifies that he is at the location associated with receiver 13. The central computer 10 responds to the PBX 50 with the location information. The PBX 50 in turn dials the telephone 52, which may be equipped with a display and a speaker for announcing or displaying the name of personnel 32. A PBX such as the IDS 228, manufactured by Executone Information Systems, Inc., is preferred in accordance to the present invention.

Figure 2:
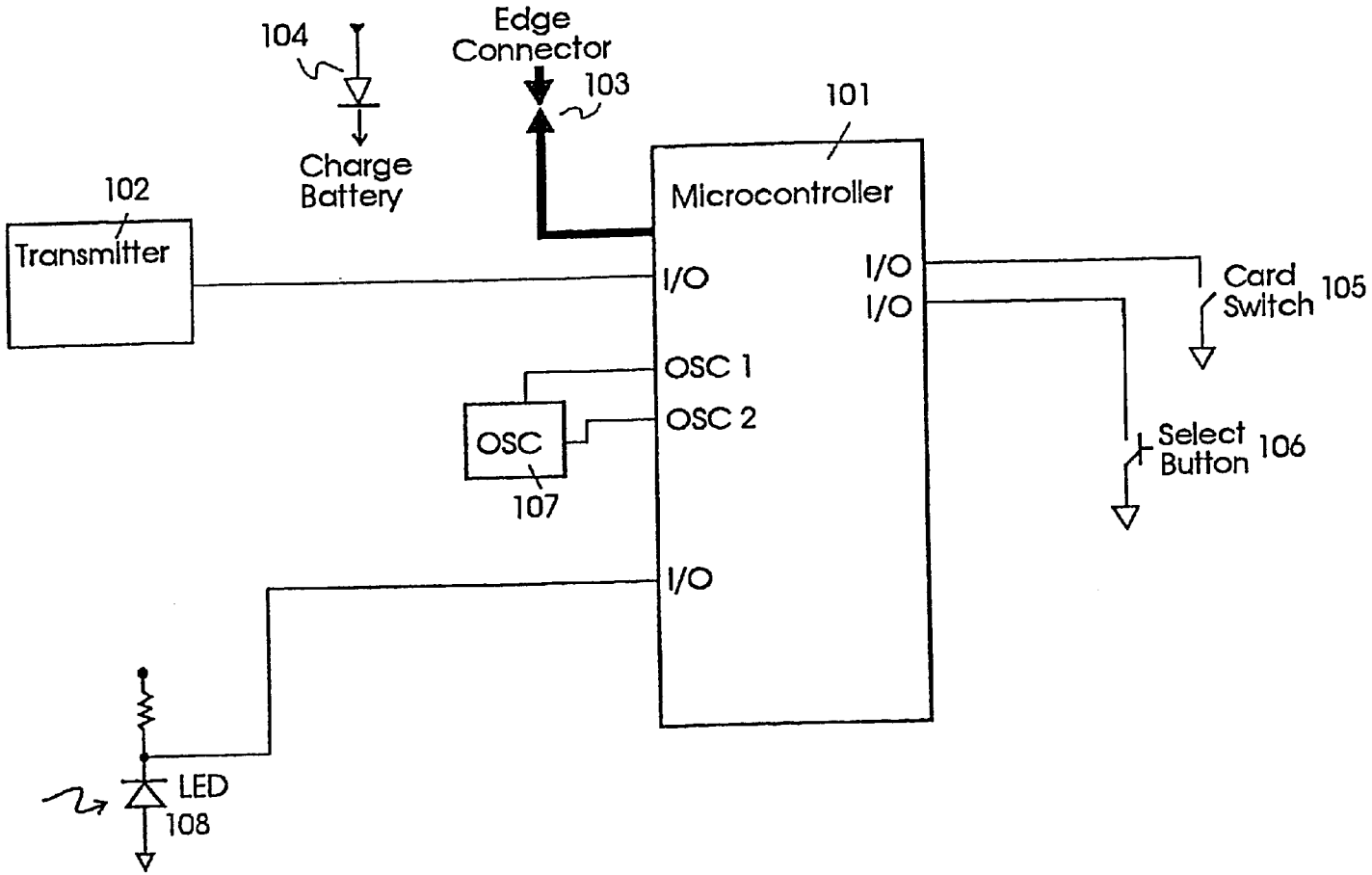
FIG. 2 is a block diagram of the components of the basic badge unit according to the present invention.

FIG. 2 shows the components of the basic badge unit according to the preferred embodiment of the present invention. The bracelet embodiment according to the present invention includes substantially the same components shown in FIG. 2. Unless specifically described otherwise, the following descriptions for the basic badge unit is equally applicable to the bracelet unit. The basic badge unit includes a microcontroller 101 for controlling the operations of the badge and a transmitter 102 for transmitting signals to a plurality of receivers. The microcontroller 101 is preferably a single integrated circuit chip which includes a processor and RAM and ROM memory. The ROM memory may be of the programmable type and stores software programs for operating the badge. These programs include: program for controlling the transmitter 102; for monitoring operational parameters; and for interfacing with external devices. The RAM memory includes a database for storing information including the identification code of the badge and operational parameters which are retrieved and monitored by the processor for operating the badge unit. The database may further include information regrading the person associated with the badge, e.g., medicine which the person is allergic to. The database may also include information relating to an associated object, e.g., medical equipment and its operating parameters or data. The processor functions include: logical and arithmetic operations and coordination of data transfer to and from the microcontroller 101. A microcontroller such as the PIC®16C5X manufactured by Microchip Technology, Inc. is used in the preferred embodiment of the present invention. It is apparent to one skilled in the art that any microcontroller having equivalent performance characteristics and similar in size may also be used.

An edge connector 103 facilitates interfacing to the components of the badge from an external device (not shown). The edge connector 103 preferably has four connections which include a "Bidirect I/O" connection to an input/output port of the microcontroller 101 for bidirectional communication with the microcontroller 101. Data can be written into or read out of the microcontroller memory by the external device ("the Base") through this connection. The Base preferably includes processing, storage and interfacing capabilities for communicating with and transferring information between the Base and the badge. A standard serial interface protocol such as RS232 may be used. An "In-Base" connection is monitored by the microcontroller 101. An active signal at the "In-Base" input indicates that the microcontroller is to relinquish control to the external device. The badge according to the present invention is powered by a battery, which preferably is made of lithium. Other battery designs such as a NICAD (nickel cadmium) rechargeable type or solar cell may also be used. Another input of the edge connector 103 may be used to recharge the battery. The fourth connection of the edge connector 103 is a spare input/output. The badge includes a light sensitive LED 108 for providing wireless means for inputting data to the microcontroller 101 by serially strobing data with a light source into the microcontroller 101.

An oscillator 107 is connected to the microcontroller 101 for providing an oscillation signal, which in turn generates a clock signal for clocking or timing purposes. In the preferred embodiment, the oscillator 107 includes a resistor/capacitor combination for providing a clock which operates at a frequency of around 455 kilohertz. Due to variations in the tolerances of the resistor/capacitor combination, the clock rate for each badge unit will vary from one badge to another substantially around 455 kilohertz. The microcontroller 101 includes a prescaler for providing timing and clock signals.

Figure 8A:
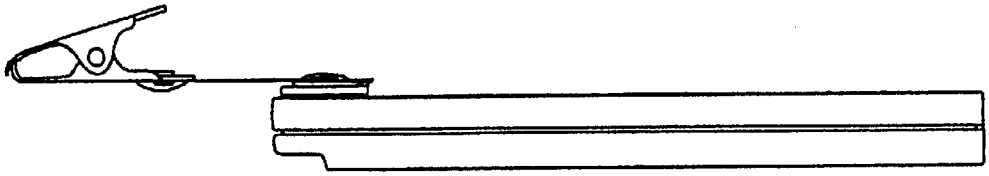
FIG. 8A illustrates the side view of the housing of the badge unit according to the present invention.
Figure 8B:
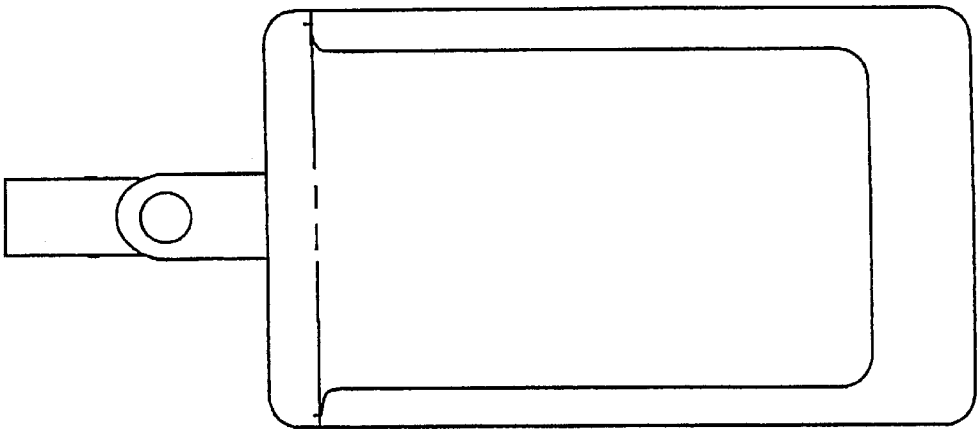
FIG. 8B illustrates the top view of the housing of the badge unit according to the present invention.

According to the preferred embodiment of the present invention, the electronics of the badge is enclosed in a housing which is shaped and sized like an ordinary credit card. FIGS. 8A and 8B illustrate the side and top views, respectively, of the badge housing, which is shown attached to a clip. The housing as shown is around 3.8" in length, 2.27" in width and 0.39" in thickness. The housing includes a slot for slidingly mating with a personnel card. A card switch 105 is disposed in the slot of the housing in the path of the personnel card such that when the personnel card is inserted into the housing, the card switch 105 is opened. The personnel card may be an ordinary business card or a smart card having electronically stored information.

A select button switch 106 facilitates manual communication to the microcontroller 101 for functions such as mode select or transmission of a preselected message, dependant upon the number and sequence of button pushes. The modes of operation include: "erase memory" for erasing the contents of the RAM memory; "turn-off transmitter" for disabling any transmission from the badge; "card reinsertion" for turning off the badge when the personnel card is removed until a card is reinserted; "ID code change" for changing the ID code to a special preselected code to signal an abnormal condition; and "disable counters" mode, which overrides parameter operations for turning off or disabling the badge and maintains badge operations.

Parameter and Database Storage

The RAM memory of the microcontroller 101 includes storage of parameter values and a database for storage of information including identification information. The data can be written into and read out of the RAM memory by the base through the edge connector 103. Data can also be serially strobed into the RAM memory via LED 108. The parameter data in the RAM is accessed by the microcontroller processor under the control of the software programs stored in the ROM memory. The parameters are used to safeguard against unauthorized usage of the badge and to conserve battery power. The parameters include: rate of transmission; maximum duration of operation; card-out duration; maximum number of transmissions; and the length of the ID.

The "rate of transmission" parameter is the time rate or period between each transmission from the transmitter 102. This parameter value is input to a counter and is counted down to zero until the next transmission. The actual rate of transmission will vary from badge to badge even if each badge is preset with the same rate of transmission because the microprocessor clock is derived from a resistor/capacitor time constant network and the microprocessor clock period will necessarily vary along with the variations within the tolerance of the resistor/capacitor devices. With such variations, when more than one badge is transmitting to the same receiver, the likelihood of two consecutive transmission bursts of information arriving at precisely the same time as the receiver is substantially nonexistent.

The "maximum duration of operation" parameter is a preset time limit which is monitored by the microcontroller processor. The expiration of this parameter causes the badge to switch to another operating mode. This parameter allows the system administrator to limit the time of usage of the badge dependent upon the user. This parameter is also useful for automatically turning off the badge after a certain time of operation to conserve battery power.

The "card out duration" parameter is the amount of time which is monitored when the personnel card is removed from the badge. The expiration of the card out duration will cause the badge unit to turn off or switch to another operating mode.

The "maximum number of transmissions" is a count value which is decremented each time a badge transmits. When this value reaches zero, the badge unit will, depending on the preset mode of operation, halt all transmissions, alert the user of the condition, and/or switch to another preselect operation mode.

The "length of ID" allows the user to adjust the transmission of the length of ID to include other pertinent information. The RAM database stores information including the identification of the badge, which may be a person's social security number or telephone number. Other information stored in the database may include data pertinent to the wearer of the badge, such as a patient's medical status or history. The microcontroller 101 may retrieve any stored data and transmit it from the badge.

Badge Software

According to the preferred embodiment of the present invention, the software programs of the badge are downloaded into the ROM during initialization from an external device such as the base. Alternatively, the programs may be preprogrammed in the ROM prior to its installation in the badge. Each badge is preassigned a classification code. The type of programs downloaded from the base to each badge may vary according to different classifications. For example, doctors and nurses may have different classifications than patients. Employees and visitors may also be classified differently. Exemplary operational programs downloaded into the ROM include: badge/external data entry unit interface; badge operation; and parameter monitoring/control.

Basic Badge Operation

Figure 3:
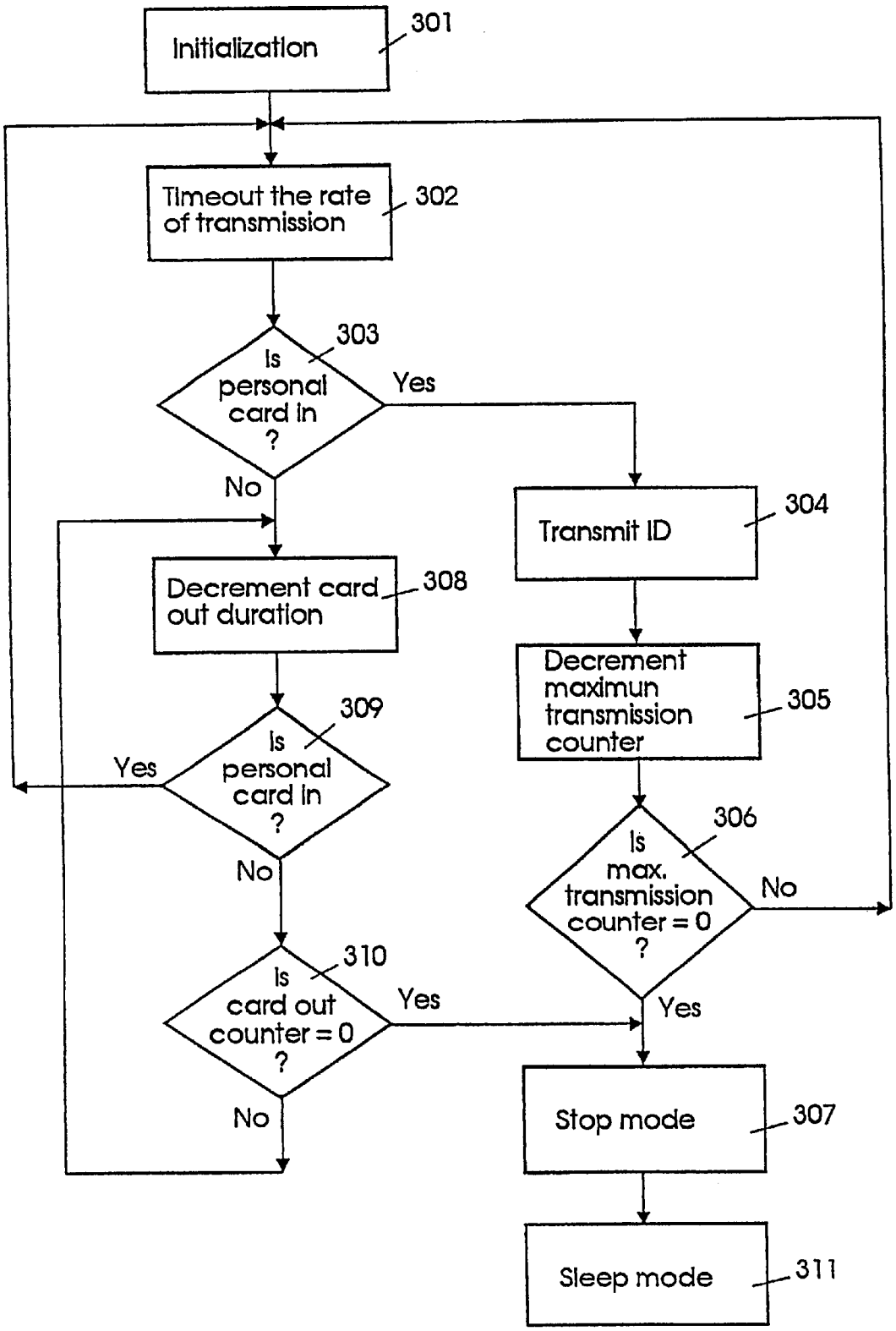
FIG. 3 is a flow diagram of the operation of the basic badge unit according to the present invention.

FIG. 3 is an illustration of an exemplary flow diagram of the operation of the basic badge unit. Each badge is initialized prior to its entry into the locator system. At initialization, the software programs of the badge are downloaded from the base in accordance to the badge's classification (step 301). In the preferred embodiment, the badge is assigned a classification which is stored in the ROM. The classification is retrieved from the badge by the base and software programs are downloaded from the base. Alternatively, the personnel card may be a smart card having stored information including the name or classification of the card owner. A smart card such as the one-chip-card, manufactured by Dai Nippon Printing Company LTD, may be used. The classification information is read from the card by the base through the edge connector 103 prior to initialization or download of the software programs to the badge memory. The operational parameters are also downloaded to the RAM. The badge is given an ID code which identifies the wearer of the badge. The ID is entered into the central computer 10 and/or the PBX 50.

After initialization, the "rate of transmission" value is retrieved, loaded into a counter and decremented to zero (step 302). The microcontroller processor then checks the card switch 105 for an open condition, signaling that the personnel card has been inserted into the badge unit (step 303). If the switch is open, the processor executes the "transmit ID" routine, which includes the steps of retrieving the ID data from the RAM memory, adding the proper transmission signal codes, converting the data to a serial format, and forwarding the data to the transmitter 102 for transmission (step 304). After transmission, the "maximum number of transmission" counter is decremented (step 305) and the counter value is checked (step 306). If the counter is zero, the badge halts further transmission (step 307). If it is not zero, the badge returns to the timeout/transmission loop (steps 302 and 303). If at any time the personnel card is removed, the removal is detected after the rate of transmission timeout. The processor then retrieves the card out duration value and commences to count down to zero (step 308). During the count down, transmission is halted and the card switch 105 is checked after each decrement until the card out duration value reaches zero (step 309). If the personnel card is inserted at any time before the card out duration reaches zero, the badge returns to the timeout/transmit loop (steps 302 and 303). If the card out duration reaches zero, the badge operation is stopped (step 307). The badge enters a sleep mode (step 311). A sleep counter is decremented and the processor is turned off. When the counter reaches zero, the processor wakes up or is turned on. The processor checks for possible tasks and if no task is pending, the processor restarts the sleep counter and returns to sleep.

Transmitter

Figure 4:
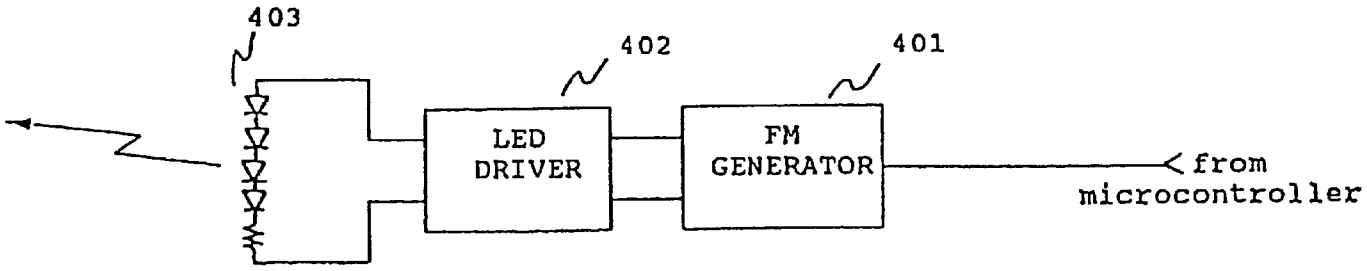
FIG. 4 is a block diagram of the components of the badge unit transmitter according to the present invention.

FIG. 4 illustrates the components of the transmitter 102 according to the preferred embodiment of the present invention. The transmitter 102 receives a serial data bit stream to be transmitted from the microcontroller 101. The FM generator 401 generates a carrier signal which is frequency modulated by the serial data. The modulated signal is fed to an LED driver 402 for providing current driving capability to LEDs 403. According to the preferred embodiment, the to LEDs 403 emit infrared signals. The FM infrared signal transmission technique is known to one skilled in the art. See, for example, the descriptions of an FM infrared transmitter/receiver in U.S. Pat. No. 4,977,619 to J. Crimmins. The disclosure of the U.S. Pat. No. 4,977,619 patent is incorporated by reference herein. It is also understood to one skilled in the art that other known wireless data transmission techniques may be used, e.g. RF transmission.

Receiver

Figure 5:
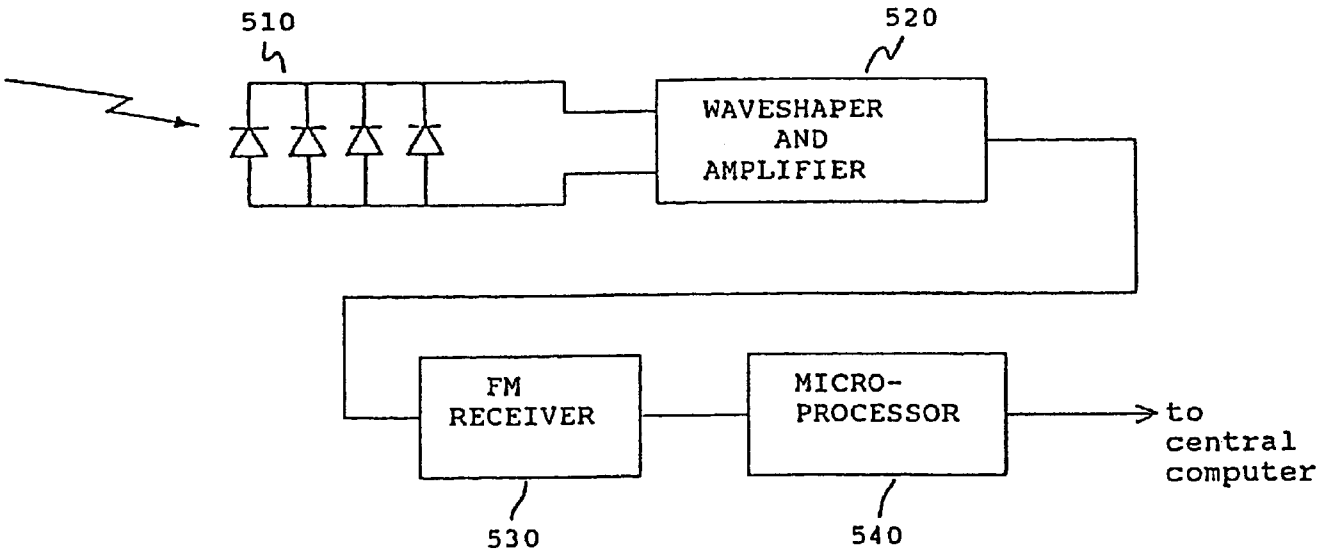
FIG. 5 is a block diagram of the components of the receiver unit according to the present invention.

FIG. 5 illustrates the components of a receiver such as any of receivers 11, 12 or 13 according to the preferred embodiment of the present invention. Infrared light sensitive diodes 510 receive the infrared signals transmitted from a transmitter 102 of a badge. Waveshaper and amplifier 520 conditions and amplifies the signals generated by the diodes 510. The Waveshaper and amplifier 520 includes a plurality of operational amplifiers for detecting the energy level of the received signal. The operational amplifiers are connected as comparators which are set at different thresholds. The comparators are monitored by the microprocessor 540 for determining the energy level of the signal received. FM receiver 530 demodulates the data from the carrier signal. Microprocessor 540 receives the serial data from the FM receiver 530. According to the preferred embodiment of the present invention, the receiver is capable of receiving infrared transmissions from badge units up to a distance of 30 feet. The microprocessor 540 extracts the information including the badge ID from the received data. The extracted data is reformatted and forwarded in a message to the central computer 10 or the PBX 50 or both. Preferably, a 64180 microprocessor, commercially available from Motorola, Inc., is used. It is apparent to one skilled in the art that any microprocessor having equivalent performance characteristics may also be used.

Badge to Receiver Transmission

The data format of the transmission between the badge and the receiver according to the preferred embodiment of the present invention is now described. Again referring to FIG. 3, when the badge operation software routine reaches step 304, the processor in microcontroller 101 fetches the data to be transmitted from the RAM memory location recognized to have the stored data for transmission, e.g., the badge identification number. The processor adds the necessary control and signaling information and formats the data in eight bit bytes plus a start and stop bit. An exemplary data burst is as follows:

| | | | | | | | | | |
|---|---|---|---|---|---|---|---|---|---|
| START / CONTROL & PARITY / | | | | | ID | | | | /STOP |
| 1 | 2 | 3 | 4 | 5 | 6 | 7 | 8 | 9 | 10 |
| START / | | | | | ID | | | | /STOP |
| 1 | 2 | 3 | 4 | 5 | 6 | 7 | 8 | 9 | 10 |

The control and parity field (e.g., bits 2 to 5 of the first byte) identifies the type of data to follow. For example, a fixed or a variable length data. A fixed length data may be known in the system as 5 bytes long. If the data is variable length, the length of data to be transmitted is identified in the control field. Parity information may also be included in this field.

The formatted data is forwarded serially from the microcontroller 101 to the transmitter 102 for transmission to a receiver. The data transmission duty cycle is selectable and preassigned, i.e., both the data transmission rate and the period between each data burst are selectable parameters and are preset during initialization. Preferably, the data is selected to transmit to the receiver at a rate of 19.2 khz and the time between each data burst (transmission period) is one to five seconds. The transmission period may vary between milliseconds to hours.

Receiver to Central Computer Communication

The information received from the badges including the badge ID is communicated to the central computer 10 or PBX 50 at selected intervals by each of the receivers connected to the location system. Depending on the configuration of the receiver, the format of the messages to the central computer may be:

header/energy level/badge data received (1)

or header/receiver location/badge data received (2)

Message type (1) includes an indication of the detected energy level of the signal received from the badge unit. This message format is used when the location of each receiver is already known to either the PBX 50 or the central computer 10. According to an alternate embodiment of the present invention in which the receiver messages are sent to the central computer 10 through the PBX 50. The alternative embodiment may be conveniently configured since the PBX 50 is already wired to all the telephones throughout the facility and has processing and database capabilities to communicate with the telephones. In such a configuration, the receivers may be connected and communicated to as if they are telephones. The PBX 50 is capable of identifying the location of each receiver or telephone. In the alternate embodiment configuration, the PBX 50 adds the location information of the receiver from which a message has just been received and forwards a new data packet to the central computer 10. The central computer 10 receives messages from each receiver, either directly or through the PBX 50, on a substantially periodic basis and processes the identification and location information. The processed information is updated in memory and retrieved when information about a particular badge or ID is requested by the user.

Message type (2) may be used in messages sent directly from the receivers to the central computer 10. This message type is especially useful when satellite receivers (not shown) are connected to a standard receiver, preferably in a token ring network. Satellite receivers may include lesser components than a standard receiver but is capable of receiving signals from badges and relaying the information to a standard receiver for communication with the central computer 10. The satellite receivers may be more widely and conveniently distributed throughout the facility. The receiver connected to the satellite receiver may act as the hub and periodically polls the satellite receivers for information. The receiver then reports all the satellite receiver information in a reformatted message to the central computer 10.

External Control of the Badge

According to the preferred embodiment, the badge unit according to the present invention may be controlled by an external device (e.g., the base) to transmit data from the external device. When the microcontroller 101 detects an active signal at the "In Base" input at the edge connector 103, the microcontroller 101 relinquishes control of the transmitter 102 and bypasses data input from the external device to the transmitter 102 for FM conversion and transmission in infrared. Any device having a RS232 interface may input data to the badge. For example, a heart rate monitoring equipment may transmit heart rate monitoring date to the central computer 10 through the badge in such a way.

Bracelet Unit

Figure 6A:
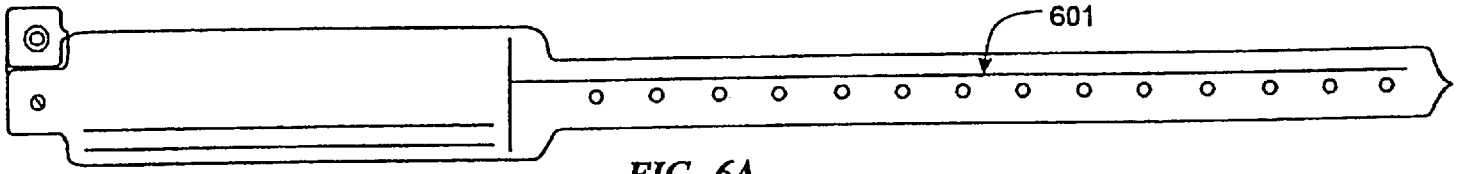
FIG. 6A illustrates the bracelet embodiment according to the present invention.

As previously discussed, the electronics and software heretofore described for the basic badge unit is also applicable to the bracelet unit. FIG. 6A illustrates the bracelet embodiment according to the present invention. The bracelet may be strapped on the wrist or the ankle of a personnel such as a patient or a baby in a hospital. The bracelet includes an interlock wire 601 which forms a closed circuit when the bracelet is in the closed position. This circuit is monitored by the microcontroller 101 and if the bracelet is opened, the microcontroller 101 senses the open condition and reports such condition to the receiver.

Figure 6B:
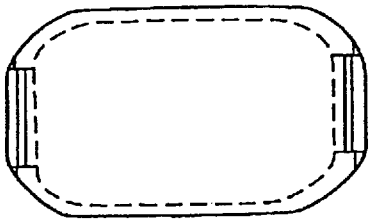
FIG. 6B illustrates the top view of the housing for attachment to the bracelet.
Figure 6C:
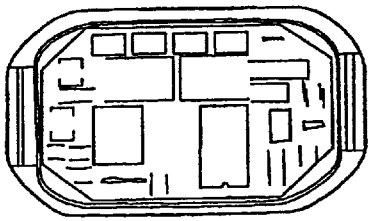
FIG. 6C illustrates the top view of the housing when the housing is opened.
Figure 6D:
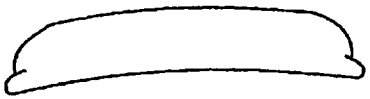
FIG. 6D illustrates the side view of the housing of the bracelet.

The electronics as shown in FIG. 2 are integrated in a housing which may be removably attached to the bracelet. FIG. 6B illustrates the top view of the housing. FIG. 6C is the top view of the bracelet housing with the cover opened, exposing the electronic components therein. FIG. 6D is a side view of the bracelet housing. The dimension of the housing is no larger than 2.0" in length, 1.25" in width and 0.44" in thickness. The bracelet unit housing is preferably hermetically sealed and therefore waterproofed. The software programs are loaded into the ROM of microcontroller 101 prior to its installation in the bracelet housing. In the alternate embodiment, the bracelet unit does not mate with a personnel card and the card switch 105 is not used. The edge connector 103 is also eliminated to conserve space. Data can be read into the bracelet unit by strobing the light sensitive LED 108.

Enhanced Badge Unit

Figure 7:
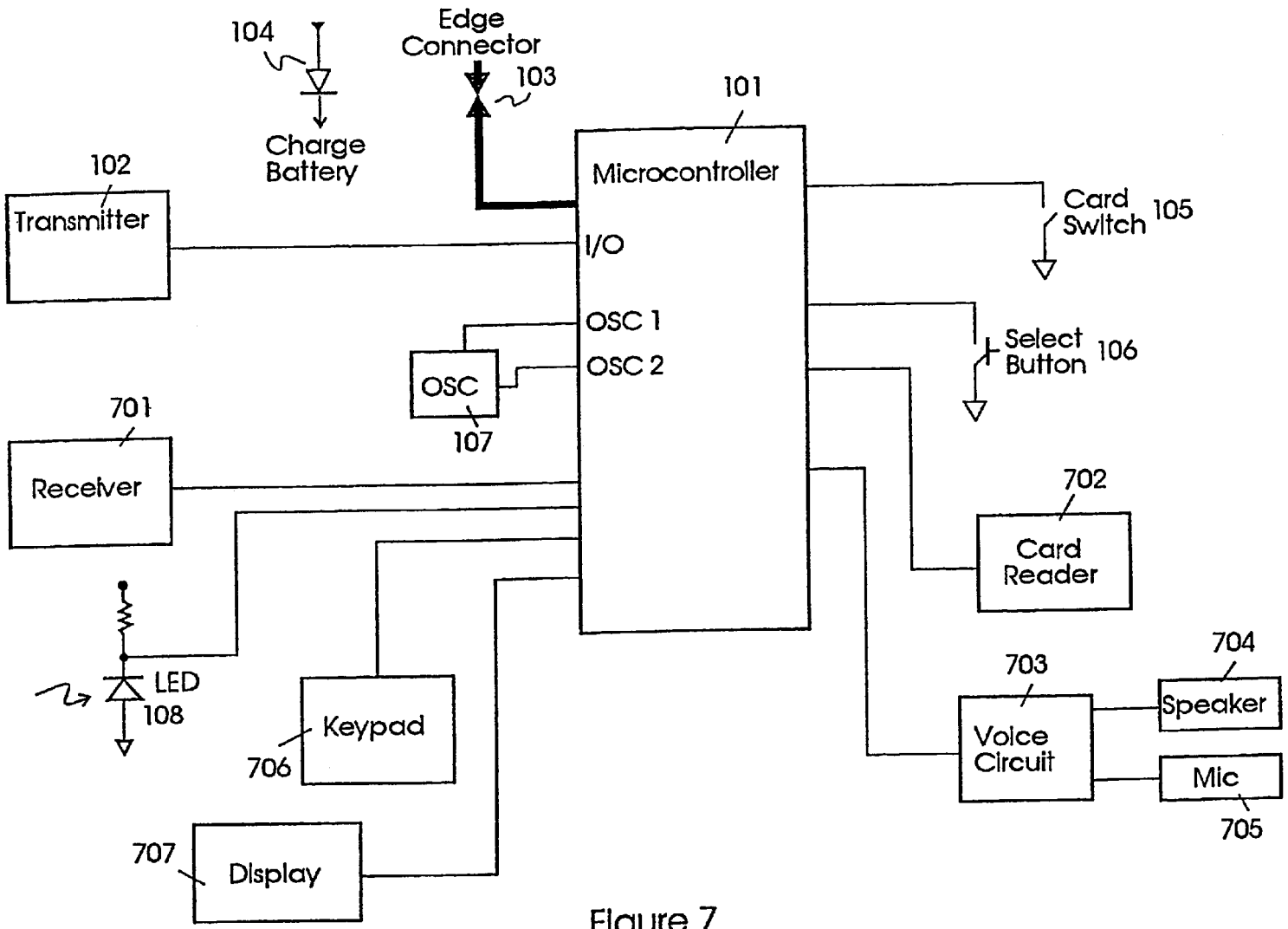
FIG. 7 illustrates a block diagram of an alternate embodiment of the badge unit according to the present invention.

FIG. 7 illustrates a block diagram of a alternate embodiment of the badge unit according to the present invention. This embodiment is an enhanced version of the basic badge unit as shown in FIG. 1. The enhanced badge unit includes all the operations previously described for the basic badge unit and further includes: an infrared receiver 701 for receiving information; a card reader 702 for reading information stored in the smart card; a voice circuit 703 for receiving voice signals from speaker 704 and for translating digital signals to audio signals received from microphone 705; a keypad 706 for keypad entry of data; a display 707 for displaying information such as data entered from the keypad 706 or data received from the receiver 701; and a membrane switch (not shown) for special designated functions such as an emergency call or sending a selected message.

The receiver 701 includes infrared light sensitive diodes 510, waveshaper and amplifier 520 and FM receiver 530 as shown in FIG. 5 for receiving infrared transmission. The received data is read into the microcontroller 101 in a serial fashion. The voice circuit 703 includes PCM encoder and decoder, digital to analog converter and analog to digital converter. Voice signals input at the microphone 705 are digitized by the analog to digital converter and encoded by the PCM encoder. The PCM data is input to microcontroller 101 for processing including storage in a memory or transmission via the transmitter 102. In the enhanced badge unit, a digital signal processor is used as the microcontroller 101. The digital signal processor includes the components of a microcomputer including RAM and ROM memory and is capable of compressing the digitized data prior to the storage in its RAM memory. Preferably, the GASM algorithm standard for converting speech signals into a 13 kbps digital bit stream is used. Similarly, if voice data is to be output to speaker 704, the data stored in the RAM memory will be retrieved, decompressed, forwarded to voice circuit 703, which decodes the PCM data, converts the digital data to analog data, then to audio signals through speaker 704. The digital signal processor may be the ADSP-21MSP50, manufactured by Analog Devices, or any other comparable DSPs commercially available.

In the enhanced system embodiment according to the present invention, each of the receivers 11, 12 and 13 includes an infrared transmitter, having electronics substantially as shown in FIG. 4, for transmitting infrared signals for reception by the enhanced badge units within the reception range of the badge receiver 701. A typical usage of the enhanced system involves the location of a badge wearer and communication of a message by the central computer 10 or PBX 50 to the badge wearer via the receive unit (11, 12 or 13) closest to the enhanced badge unit. The message received by the enhanced badge may be displayed on display 707 or converted to voice by voice circuit 703 and/or announced over speaker 704. The badge wearer can in turn reply by speaking into the microphone 705. The voice circuit 703 digitizes the analog signal for the microphone 705 and the microcontroller 101 adds the necessary control information prior to transmission of the message through the transmitter 102 to the receivers 11, 12 or 13, which in turn transmits to the central computer 10 or PBX 50. The badge wearer may also reply by entering a text message via the keypad 706.

Exemplary software program commands and specifications suitable for usage in accordance with the locator system of the present invention is attached as the appendix.

It should be understood that various changes and modifications to the preferred embodiments described above will be apparent to those skilled in the art without departing from the spirit and the scope of the invention. These changes and modifications are intended to be covered by the following claims.

We claim:

1. A badge for use in an object location and information retrieval system for locating within a facility an object coupled to said badge and obtaining information stored in said badge, said system having a central computer, a plurality of receivers disposed at spaced apart areas within said facility, each of said receivers being capable of receiving signals from said badge and communicating signals including the identification of said badge to said central computer, said badge comprising:

a transmitter for transmitting signals including a unique identification signal of said badge;

an on/off switch;

manual select means for selecting one of a plurality of operating modes;

a microcontroller having a processor, associated memory and stored programs, said memory having a database with stored information including a plurality of operational parameters and a plurality of records specific to said object being coupled to said badge, said stored programs being executed by said processor for controlling badge operations including the control of said transmitter depending upon the processing of said parameters;

means in said processor for accessing information from said database in said memory and for forwarding said information to said transmitter for transmission to one of said plurality of receivers;

a receiver;

display means for displaying information received by said receiver, transmitted by said transmitter, and stored in said memory database;

an audio interface having a voice circuit and a microphone, said voice circuit having amplification means and digital conversion means for converting digital signals into voice signals and for amplifying said voice signals for playing over a speaker, said microphone having voice digitization means for digitizing voice signals for transmitting said voice signals via said transmitter to one of said plurality of receivers; and a data interface for interfacing with an external processing device for reading data from said memory database or entering data including operational parameter values into said memory database.

2. A badge according to claim 1 wherein said transmitter transmits infrared signals.

3. A badge according to claim 1 wherein said plurality of operational parameters include the period of transmission of said signals.

4. A badge according to claim 1 wherein said plurality of parameters include the duration of transmitter operation.

5. A badge according to claim 4 wherein said transmitter operation duration is monitored by said microcontroller and upon the expiration of said duration, said microcontroller switches to another mode of operation.

6. A badge according to claim 5 wherein said another mode of operation include erasing the contents of said database in said memory.

7. A badge according to claim 5 wherein said another mode of operation include turning off said transmitter.

8. A badge according to claim 5 wherein said another mode of operation include changing the identification signal of said badge.

9. A badge according to claim 1 further including a counter for counting the number of transmissions transmitted from said transmitter.

10. A badge according to claim 1 wherein said identification of said badge is a person's social security number.

11. A badge according to claim 1 wherein said database in said memory includes medical status information of a person.

12. A badge according to claim 1 further including a rechargeable battery and means for recharging said battery.

13. A badge according to claim 1 further including a housing, said housing including a slot for slidingly mating with a personnel card.

14. A badge according to claim 13 further including a switch for turning off said transmitter when switch is in an open position, said switch is opened upon the removal of said personnel card.

15. A badge according to claim 13 wherein said personnel card includes stored data including identification data and said badge includes means for accessing said stored data.

16. A badge according to claim 1, wherein said receiver receives infrared signals.

17. A badge according to claim 1 wherein said central computer is coupled to an LAN for coupling to a plurality of processing units for communication with said central computer.

18. A badge according to claim 1 wherein said central computer is coupled to a PBX for coupling to a plurality of telephones.

19. A badge according to claim 18 wherein the location information of a badge to be located within said facility is retrievable by dialing the identification of said badge to be located from any of said plurality of telephones coupled to said PBX.

20. A badge according to claim 1 wherein said data interface includes a bidirectional connection for facilitating communication between said external processing device and said microcontroller.

21. A badge according to claim 1 wherein said external processing device is a keypad.

22. A bracelet for use in an object location tracking and information retrieval system for locating within a location an object coupled to said bracelet and obtaining information stored in said bracelet, said system having a central computer, a plurality of receivers disposed at spaced apart areas within said location, each of said receivers being capable of receiving signals from said bracelet and transmitting signals including the identification of said bracelet to said central computer, said bracelet having a housing with electronics integrated therein, comprising:

a transmitter for transmitting signals including a unique identification signal of said bracelet;

a microprocessor having associated memory and stored programs, said memory having a database storage of a plurality of records about said object including the identification of said object, said stored programs being executed by said microprocessor for controlling bracelet operations, said microprocessor further includes means for accessing information from said database in memory and for forwarding said information to said transmitter for transmission to one of said plurality of receivers;

a receiver;

display means for displaying information received by said receiver, transmitted by said transmitter, and stored in said memory database;

an audio interface having a voice circuit and a microphone, said voice circuit having amplification means and digital conversion means for converting digital signals into voice signals and for amplifying said voice signals for playing over a speaker, said microphone having voice digitization means for digitizing voice signals for transmitting said voice signals via said transmitter to one of said plurality of receivers; and wherein said transmitter is preassigned with a duration of operation, said duration of operation is monitored by said microprocessor and upon the expiration of said duration, said microprocessor switches to another mode of operation.

23. A bracelet according to claim 22, wherein said integrated electronics is enclosed in the housing removably attached to said bracelet, said housing is less than 0.44 inches in thickness, 2.0 inches in length and 1.25 inches in width.

24. A bracelet according to claim 23 wherein said housing is waterproof.

25. A bracelet according to claim 22 wherein said bracelet includes means for receiving signals from an external data entry device and means for storing said received signals into said memory.

26. A bracelet according to claim 25 wherein said means for receiving signals is capable of receiving infrared signals.

27. A bracelet according to claim 22, further including:

means for forming a closed circuit when said bracelet is in a closed position; means for detecting an open condition when said bracelet is opened; and means for indicating said open condition when said open condition is detected.

28. A bracelet according to claim 22 wherein said transmitter transmits infrared signals.

29. A bracelet according to claim 22 wherein said stored information includes a plurality of operational parameters, said operational parameters being used in conjunction with said stored programs for controlling bracelet operations.

30. A bracelet according to claim 22 wherein said another mode of operation includes erasing the contents of said database in said memory.

31. A bracelet according to claim 22 wherein said another mode of operation includes turning off said transmitter.

32. A bracelet according to claim 22 wherein said another mode of operation includes changing the identification signal of said bracelet.

33. A bracelet according to claim 22 further including a counter for counting the number of transmissions transmitted from said transmitter.

34. A bracelet according to claim 22 wherein said identification of said bracelet is a person's social security number.

35. A bracelet according to claim 22 wherein said database in said memory includes medical status information of a person.

36. A bracelet according to claim 22 further including a rechargeable battery and means for recharging said battery.

37. A bracelet according to claim 22 further including a manual select button for selecting one of a plurality of operating modes of said bracelet.

38. An object location tracking and information retrieval system comprising:

a plurality of badges coupled to objects to be tracked, each of said badges including: wireless transmission means for transmitting signals including a unique identification signal; processor means having associated memory and stored programs, said memory having a database storage of a plurality of records specific to an object coupled to said badge and a plurality of operational parameters, said stored programs being executed by said processor means for controlling badge operations including the control of said wireless transmission means depending upon the processing of said parameters; means for interfacing with external means for reading and entering data including operational parameter values into said memory database; and means in said processor for accessing information from said database and for forwarding said information to said wireless transmission means;

a plurality of receivers disposed at spaced apart areas, each of said receivers including means for receiving said signals including said unique identification signals and said information accessed from said database transmitted from said wireless transmission means of said badges, and processor means for processing said received signals; and central processing means for receiving messages from said plurality of receivers, said messages including said unique identification signals of said badges, and means for tracking the location of each of said plurality of badges each of said badges further includes: an on/off switch; manual select means for selecting one of a plurality of operating modes; a receiver; display means for displaying information received by said receiver, transmitted by said wireless transmission means, and stored in said memory database; and an audio interface having a voice circuit and a microphone, said voice circuit having amplification means and digital conversion means for converting digital signals into voice signals and for amplifying said voice signals for playing over a speaker, said microphone having voice digitization means for digitizing voice signals for transmitting said voice signals via said wireless transmission means to said plurality of receivers.

39. An object location tracking and information retrieval system according to claim 38, wherein said central processing means includes private branch exchange means for communicating with a plurality of telephones.

40. An object location tracking and information retrieval system according to claim 39, wherein said central processing means is coupled to a local area network for coupling to a plurality of processing units.

41. A badge according to claim 38 wherein said plurality of records within said database includes medical information.

*42. A device for use in a object location tracking and information retrieval system for locating within a location an object coupled to the device and obtaining information relating to the object, comprising:*

*a housing having means for coupling to the object;*

*a transmitter disposed within the housing for repeatedly and intermittently transmitting a first coded signal including a unique identification signal of the device;*

*an on/off switch;*

*manual select means for selecting one of a plurality of operation modes;*

*a microcontroller having a processor, a memory, and at least one program stored in the memory, the memory including a database of operational parameters and records specific to the object to which the device is coupled, the processor controlling the execution of the at least one program and the transmitter in response to processing of the operational parameters, the processor being capable of accessing the database to provide information to the transmitter for transmitting the information;*

*a receiver disposed within the housing for receiving a second coded signal transmitted by a central base station of the system and having a string of data encoding information, the receiver including means for indicating receipt of the second coded signal;*

*display means for displaying information received by said receiver, transmitted by said transmitter, and stored in said memory database; and*

*an audio interface having a voice circuit and a microphone, said voice circuit having amplification means and digital conversion means for converting digital signals into voice signals and for amplifying said voice signals for playing over a speaker, said microphone having voice digitization means for digitizing voice signals for transmitting said voice signals via said transmitter to said receiver;*

*wherein said transmitter is preassigned with a duration of operation, said duration of operation is monitored by said microprocessor and upon the expiration of said duration, said microprocessor switches to another mode of operation;*

*wherein the microcontroller analyzes the string of data to determine if the device is an intended recipient of the second coded signal.*

*43. A device for use in an object location tracking and information retrieval system according to claim 42, further comprising a data interface port for inputting data to the database or outputting data from the database.*

*44. A device for use in an object location tracking and information retrieval system according to claim 43, wherein the data to be input and output to and from the database includes operational parameters of the device and the system.*

*45. A device for use in an object location tracking and information retrieval system according to claim 42, further comprising a manual select switch for selecting one of a plurality of operating modes.*

*46. A device for use in an object location tracking and information retrieval system according to claim 42, wherein the first and second coded signals are infrared transmissions.*

*47. A device for use in an object location tracking and information retrieval system according to claim 42, wherein the device is powered by a battery disposed within the housing.*

*48. A device for use in an object location tracking and information retrieval system according to claim 47, wherein the first coded signal transmitted by the transmitter includes information stored in the database as requested by the central base station, including operational parameters of the device.*

*49. A device for use in an object location tracking and information retrieval system according to claim 48, wherein the operational parameters includes an indication of battery lifetime of the battery of the device.*

*50. A device for use in an object location tracking and information retrieval system according to claim 42, wherein the housing is waterproof.*

*51. A device for use in an object location tracking and information retrieval system for locating within a location an object coupled to the device and obtaining information relating to the object, comprising:*

*a badge device for coupling to an object to be tracked, the badge device having a housing;*

*an on/off switch;*

*manual select means for selecting one of a plurality of operating modes;*

*a signal receiver in the housing for receiving a first, coded signal;*

*a processor means in the housing in communication with the signal receiver and being responsive to the first, coded signal for generating a second signal;*

*a transmitter in the housing in communication with the processor means and being responsive to the second signal for repeatedly and intermittently transmitting a third, coded signal, wherein said transmitter is preassigned with a duration of operation, said duration of operation is monitored by said processor means and upon the expiration of said duration, said processor means switches to another mode of operation;*

*an external programming device including means for transmitting the first, coded signal to the signal receiver, the first, coded signal having the operational parameters of the badge device encoded therein for storing within a database memory of the device;*

*means in said processor for accessing information from said database memory and for forwarding said information to said transmitter for transmission, wherein said information includes a plurality of records specific to said object being coupled to said badge device;*

*display means for displaying information received by said signal receiver, transmitted by said transmitter, and stored in said database memory; and*

*an audio interface having a voice circuit and a microphone, said voice circuit having amplification means and digital conversion means for converting digital signals into voice signals and for amplifying said voice signals for playing over a speaker, said microphone having voice digitization means for digitizing voice signals for transmitting said voice signals via said transmitter to said signal receiver.*

*52. The device of claim 51, wherein the first, coded signal further includes data pertinent to the object to which the badge is coupled.*

*53. The device of claim 51, wherein the programming device transmits the first, coded signal as an infrared signal.*

*54. The device of claim 53, wherein the programming device transmits the first, coded signal via a light source, the badge device including a light sensitive LED for entry of data.*

*55. The device of claim 51, wherein the device is powered by a battery in the housing of the badge.*

*56. The device of claim 51, wherein the housing of the badge device is waterproof.*

*57. A method of automatically locating a person or object in a location in response to a telephone inquiry from a telephone connected to a telephone system, comprising the steps of:*

*continuously controlling via control signals operation of a plurality of transmitters attached to a plurality of persons or objects to be monitored to repeatedly and intermittently transmit signals encoded with identification data unique to each of the plurality of persons or objects to be monitored, each of the plurality of transmitters being connected to a corresponding microcontroller providing the control signals and having an on/off switch and a manual select means for selecting one of a plurality of operating modes;*

*accessing information from a database memory of said corresponding microcontroller and forwarding said information to one of the plurality of transmitters for transmission, wherein said information includes a plurality of records specific to said each of the plurality of objects being coupled to each of the plurality of corresponding transmitters;*

*preassigning each of said plurality of transmitters with a duration of operation, said duration of operation being monitored by said corresponding microcontroller and upon the expiration of said duration, said corresponding microcontroller switches to another mode of operation;*

*tracking, based on signals received from transmitters, the locations of the persons or objects within at least a define area using a network of receivers positioned throughout the defined area;*

*storing current location data in a database;*

*retrieving requested location data of a person or object in response to the inquiry;*

*providing said requested location data over the telephone system to the telephone connected to the telephone system;*

*displaying information received by said network of receivers, transmitted by said plurality of transmitters, and stored in said database;*

*converting digital signals into voice signals and amplifying said voice signals for playing over a speaker; and*

*digitizing said voice signals for transmitting said voice signals via at least one transmitter of said plurality of transmitters to at least one receiver of said network of receivers.*

*58. The method of claim 57, wherein said step of tracking is accomplished using an infrared signal network.*

*59. The method of claim 57, further comprising the steps of:*

*selecting the identity of a telephone according to a predetermined protocol based upon the retrieved requested location data; and*

*connecting the telephone connected to the telephone system automatically to said selected telephone.*

*60. A system for automatically locating a person or object in response to a telephone inquiry by a user over a telephone system, comprising:*

*at least one transmitter attached to a person or object whose movement is to be monitored at least within a defined area, said at least one transmitter operable to repeatedly and intermittently transmit a signal including unique identification information associated with said person or object, said at least one transmitter connected to a microcontroller having means for accessing information from at least one database memory and for forwarding said information to said at least one transmitter for transmission, said microcontroller having an on/off switch and manual select means for selecting one of a plurality of operating modes;*

*a plurality of receivers operable to receive said transmitted signal, each receiver of said plurality of receivers positioned at a respective predetermined location within said defined area;*

*wherein said microcontroller is operable to store said received identification information including a plurality of records specific to said object being coupled to said at least one transmitter and respective location data of each of said receivers within the at least one database memory and further being operable to update the location data stored with the at least one database memory in response to the movement of said person or object;*

*display means for displaying information received by at least one of said plurality of receivers, transmitted by said at least one transmitter, and stored within said at least one database memory;*

*an audio interface having a voice circuit and a microphone, said voice circuit having amplification means and digital conversion means for converting digital signals into voice signals and for amplifying said voice signals for playing over a speaker, said microphone having voice digitization means for digitizing voice signals for transmitting said voice signals via said at least one transmitter to said at least one of said plurality of receivers; and*

*means to provide a message over the telephone system to the user wherein the message content gives the location of said person or object from a plurality of locations in response to a determination of said updated location, wherein said at least one transmitter is preassigned with a duration of operation, said duration of operation is monitored by said microcontroller and upon the expiration of said duration, said microcontroller switches to another mode of operation.*

*61. The system of claim 60, wherein said at least one transmitter comprises an infrared transmitter.*

* * * * *